United States Patent [19]

Lassanske et al.

[11] Patent Number: 5,203,167
[45] Date of Patent: Apr. 20, 1993

[54] MARINE PROPULSION DEVICE INTERNAL COMBUSTION ENGINE AND METHOD FOR MAKING THE SAME

[75] Inventors: George G. Lassanske, Nashota; Lee A. Woodward, Racine, both of Wis.

[73] Assignee: Outboard Marine Corporation, Waukegan, Ill.

[21] Appl. No.: 782,427

[22] Filed: Oct. 25, 1991

[51] Int. Cl.[5] ............................................. F01N 3/24
[52] U.S. Cl. ....................................... 60/298; 60/302; 440/89
[58] Field of Search .................. 60/298, 302; 440/89, 440/900

[56] References Cited

U.S. PATENT DOCUMENTS

| | | | |
|---|---|---|---|
| 2,046,252 | 6/1036 | Davis | 181/35 |
| 3,017,255 | 1/1962 | Norris | 23/288 |
| 4,151,717 | 5/1979 | Katsumoto et al. | 60/302 |
| 4,215,538 | 8/1980 | Steinwart et al. | 60/276 |
| 4,735,046 | 4/1988 | Iwai | 60/295 |
| 4,772,236 | 9/1988 | Takahashi | 440/89 |
| 4,848,082 | 7/1989 | Takahashi et al. | 60/285 |
| 4,900,282 | 2/1990 | Takahashi et al. | 60/302 |

Primary Examiner—Ira S. Lazarus
Assistant Examiner—L. Heyman
Attorney, Agent, or Firm—Michael, Best & Friedrich

[57] ABSTRACT

A marine propulsion device comprising a drive shaft housing, a propeller shaft rotatably supported by the drive shaft housing, an internal combustion engine drivingly connected to the propeller shaft, the engine including a cylinder block defining a cylinder having an exhaust port, and defining an exhaust outlet, and an exhaust passage between the exhaust port and the exhaust outlet, an exhaust catalyst apparatus mounted on the cylinder block, the apparatus including a tongue extending into the cylinder block exhaust passage and dividing the cylinder block exhaust passage into an upstream portion communicating with the exhaust port and a downstream portion communicating with the exhaust outlet, and the apparatus including an exhaust passage communicating between the upstream portion and the downstream portion, and a catalyst located in the apparatus exhaust passage.

26 Claims, 4 Drawing Sheets

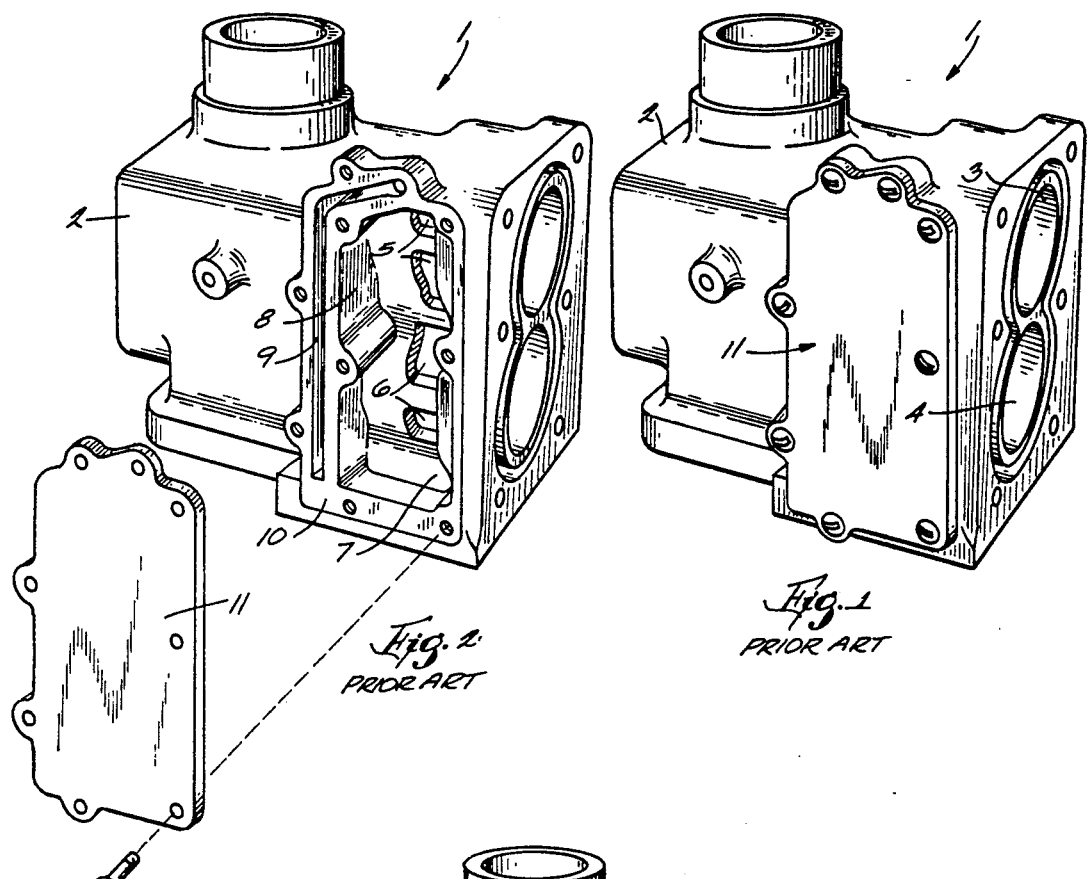
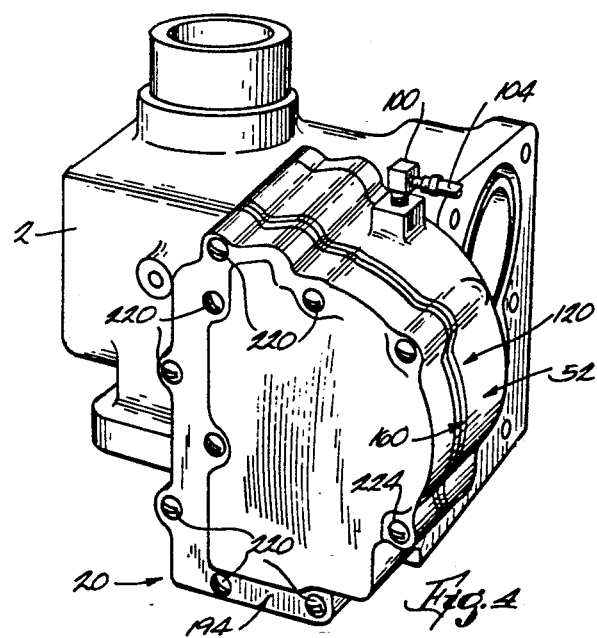

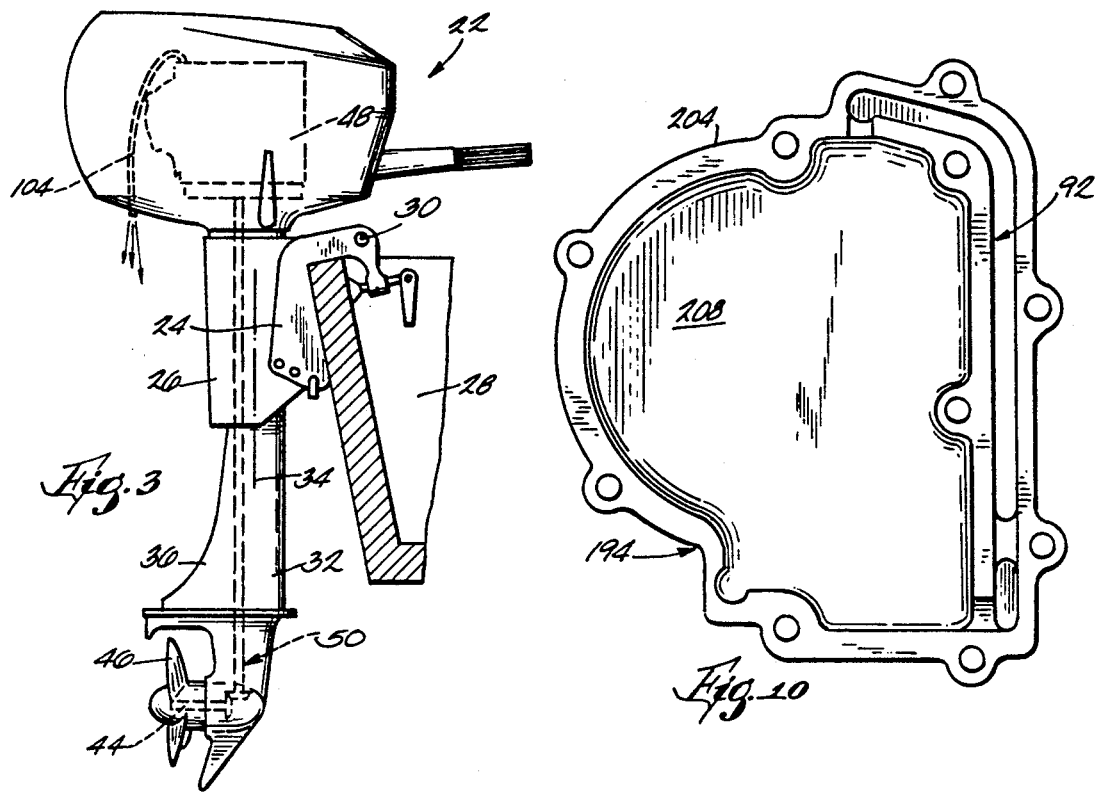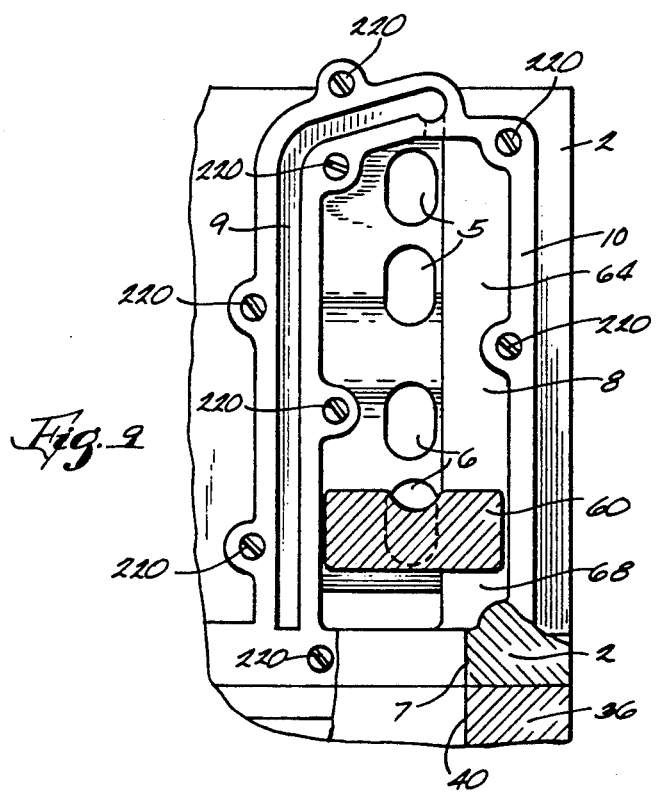

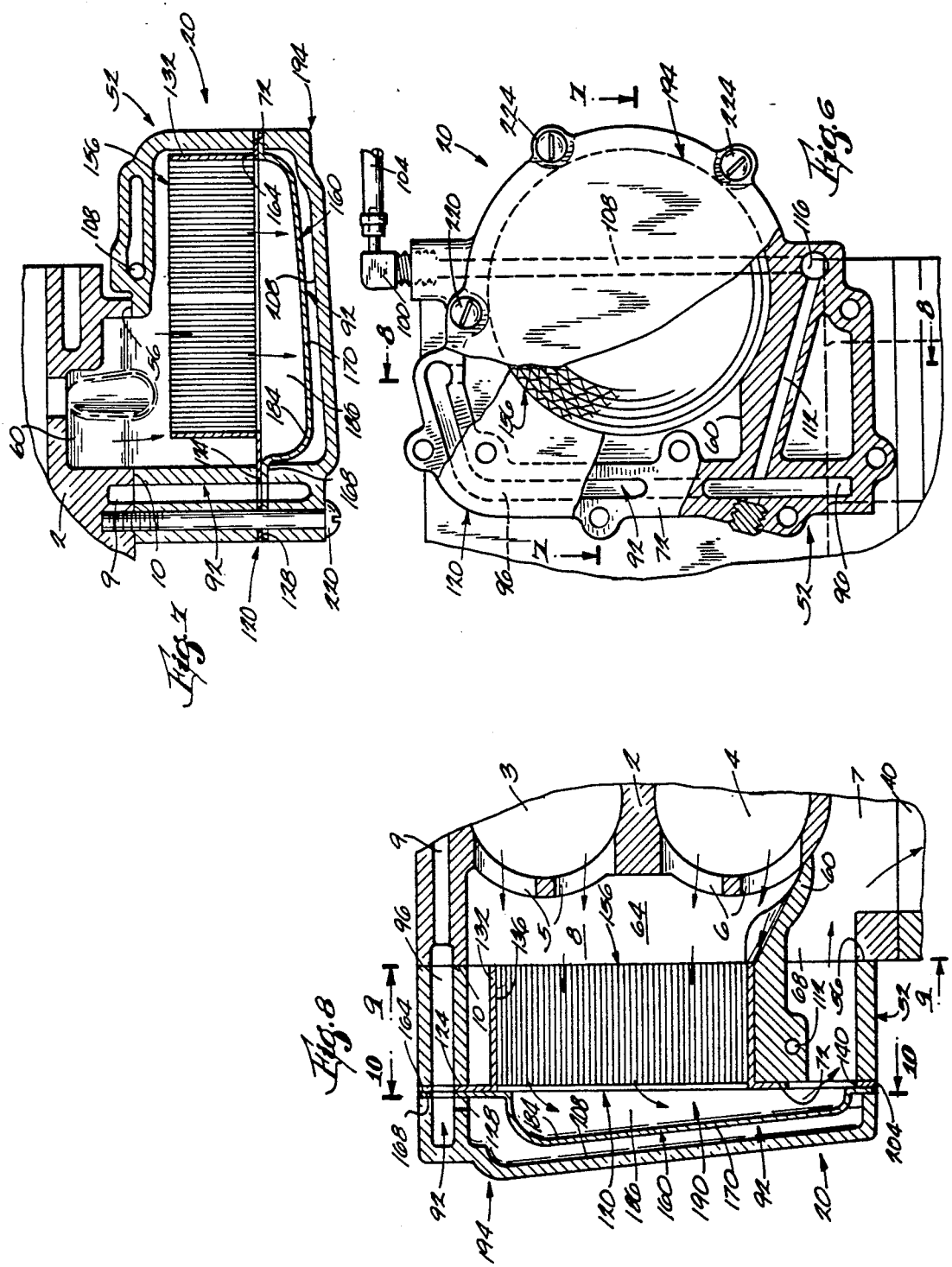

MARINE PROPULSION DEVICE INTERNAL COMBUSTION ENGINE AND METHOD FOR MAKING THE SAME

BACKGROUND OF THE INVENTION

The invention relates to internal combustion engines, and more particularly to internal combustion engines used in outboard motors. The invention also relates to catalyst apparatus used in connection with internal combustion engines.

A prior art internal combustion engine 1 is illustrated in FIGS. 1 and 2. The engine 1 is a two-cylinder, two-cycle engine used in an outboard motor. The engine 1 includes a cylinder block 2 defining upper and lower cylinders 3 and 4 having (see FIG. 2) respective upper and lower exhaust ports 5 and 6. The cylinder block 2 also defines, in the lower end of the cylinder block, an exhaust outlet 7. The cylinder block partially defines an exhaust passage 8 communicating between the exhaust ports 5 and 6 and the exhaust outlet 7, and a water jacket 9 surrounding the cylinders 3 and 4 and extending adjacent the exhaust passage 8. The cylinder block includes a mounting surface 10 having mounted thereon an exhaust cover plate 11 further defining the exhaust passage 8 and the water jacket 9.

When the engine 1 is used in an outboard motor, exhaust gases flow out the exhaust ports 5 and 6, through the exhaust passage 8, and out the exhaust outlet 7 into a conventional exhaust passageway in the lower unit.

SUMMARY OF THE INVENTION

The invention provides a marine propulsion device comprising a drive shaft housing, a propeller shaft rotatably supported by the drive shaft housing, an internal combustion engine drivingly connected to the propeller shaft, the engine including a cylinder block defining a cylinder having an exhaust port, and defining an exhaust outlet, and an exhaust passage between the exhaust port and the exhaust outlet, an exhaust catalyst apparatus mounted on the cylinder block, the apparatus including a tongue extending into the cylinder block exhaust passage and dividing the cylinder block exhaust passage into an upstream portion communicating with the exhaust port and a downstream portion communicating with the exhaust outlet, and the apparatus including an exhaust passage communicating between the upstream portion and the downstream portion, and a catalyst located in the apparatus exhaust passage.

One embodiment of the invention provides an internal combustion engine comprising a cylinder block defining a cylinder having an exhaust port, and defining an exhaust outlet, and an exhaust passage between the exhaust port and the exhaust outlet, an exhaust catalyst apparatus mounted on the cylinder block, the apparatus including a tongue extending into the cylinder block exhaust passage and dividing the cylinder block exhaust passage into an upstream portion communicating with the exhaust port and a downstream portion communicating with the exhaust outlet, and the apparatus including an exhaust passage communicating between the upstream portion and the downstream portion, and a catalyst located in the apparatus exhaust passage.

One embodiment of the invention provides a method for adding a catalytic apparatus to an internal combustion engine including a cylinder block defining a cylinder having an exhaust port, and defining an exhaust outlet, an exhaust passage between the exhaust port and the exhaust outlet, and a mounting surface having mounted thereon an exhaust cover further defining the exhaust passage, the method comprising the steps of removing the exhaust cover, and mounting on the cylinder block a catalytic apparatus comprising an exhaust catalyst housing mounted on the cylinder block mounting surface, the housing including a tongue extending into the cylinder block exhaust passage and dividing the cylinder block exhaust passage into an upstream portion communicating with the exhaust port and a downstream portion communicating with the exhaust outlet, and the housing including an exhaust passage communicating between the upstream portion and the downstream portion, and a catalyst located in the housing exhaust passage.

One embodiment of the invention provides an outboard motor comprising a drive shaft housing, a propeller shaft rotatably supported by the drive shaft housing, an internal combustion engine drivingly connected to the propeller shaft, the engine including a cylinder block which has a lower end, which is mounted on the drive shaft housing, and which defines a cylinder having an exhaust port, an exhaust catalyst apparatus mounted on the cylinder block, the apparatus defining an exhaust inlet communicating with the cylinder block exhaust port, an exhaust outlet, and an exhaust passage communicating between the apparatus inlet and the apparatus outlet, and a catalyst located above the lower end of the cylinder block and located in the apparatus exhaust passage such that substantially all exhaust gases flowing from the exhaust port to the atmosphere flow through the catalyst.

One embodiment of the invention provides an internal combustion engine comprising cylinder block means defining an exhaust inlet and an exhaust outlet, a catalyst housing connected to the cylinder block means, a catalyst supported by the catalyst housing, an exhaust baffle which is connected to the catalyst housing such that the catalyst housing is located between the exhaust baffle and the cylinder block means, and which cooperates with the catalyst housing to define an exhaust passage that communicates between the exhaust outlet and the exhaust inlet and that has therein the catalyst, and a cover which is connected to the exhaust baffle such that the exhaust baffle is located between the cover and the catalyst housing and which cooperates with the exhaust baffle to define a water jacket adjacent the exhaust passage.

A principal feature of the invention is the provision of a method for substituting a catalytic apparatus for the exhaust cover of a conventional cylinder block.

Another principal feature of the invention is the provision of a catalytic apparatus including a tongue diverting exhaust gases in a cylinder block exhaust passage through a catalyst.

Another principal feature of the invention is the provision of an outboard motor including a catalyst which is located above the lower end of the cylinder block and through which substantially all exhaust gases flow.

Another principal feature of the invention is the provision of a catalytic apparatus including stacked components as described above.

Other features and advantages of the invention will become apparent to those of ordinary skill in the art upon review of the following detailed description, claims, and drawings.

DESCRIPTION OF THE DRAWINGS

FIG. 1 is a perspective view of a prior art internal combustion engine.

FIG. 2 is an exploded view of the engine shown in FIG. 1.

FIG. 3 is a side elevational view of an outboard motor embodying the invention.

FIG. 4 is a perspective view of the engine of the outboard motor shown in FIG. 3.

FIG. 6 is a partial elevational view, partially in section, of the engine shown in FIG. 4.

FIG. 7 is a view taken along line 7—7 in FIG. 6.

FIG. 8 is a view taken along line 8—8 in FIG. 6.

FIG. 9 is a view taken along line 9—9 in FIG. 8.

FIG. 10 is a view of the cover taken along line 10—10 in FIG. 8.

Figure 5:
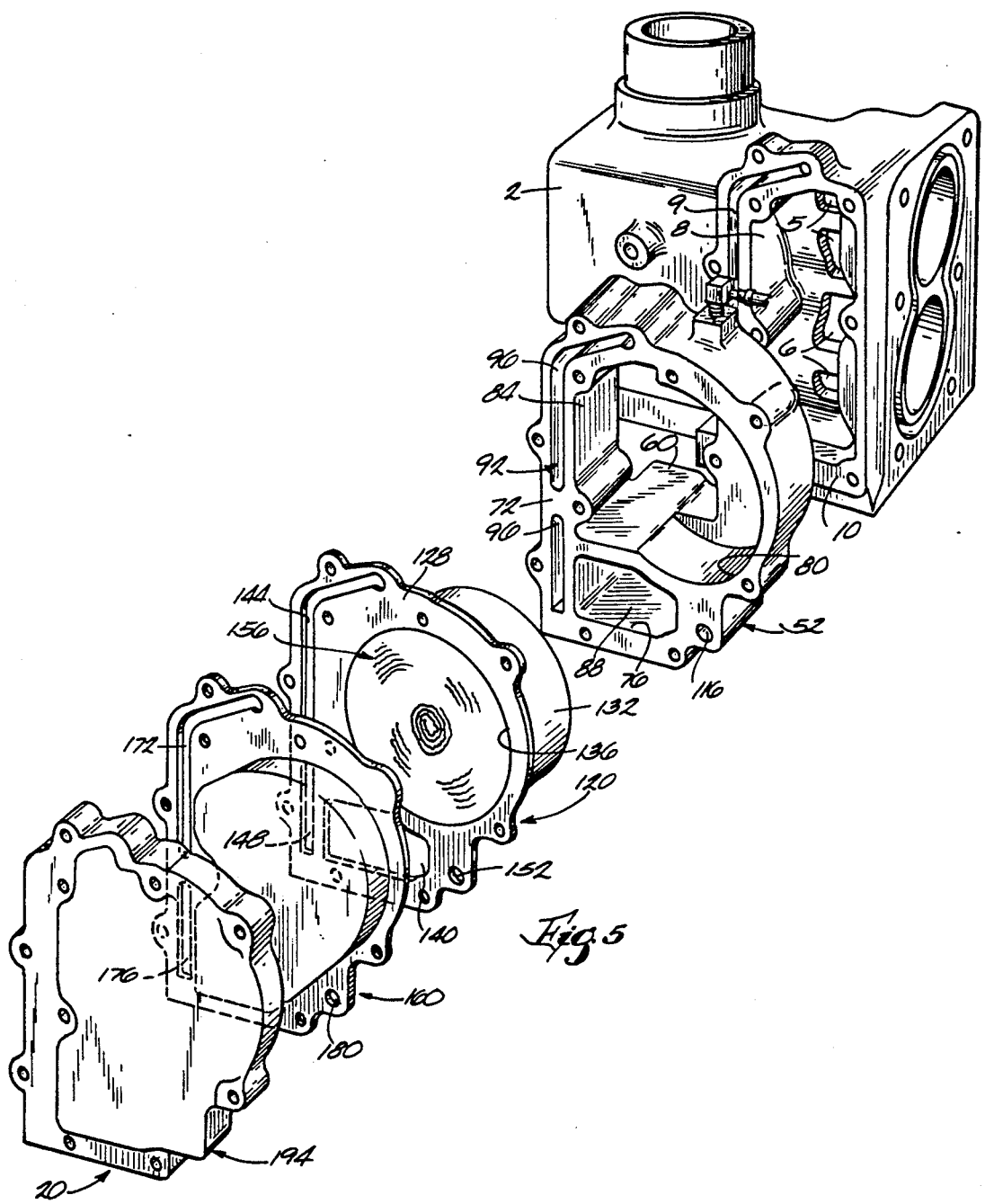
FIG. 5 is an exploded view of the engine shown in FIG. 4.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

The invention provides a method for adding a catalytic apparatus 20 to the prior art internal combustion engine shown in FIGS. 1 and 2. The catalytic apparatus 20 can be added, for example, to an outboard motor including the engine 1 illustrated in FIGS. 1 and 2. The catalytic apparatus 20 is added to the engine 1 by removing the prior art exhaust cover 11 and mounting the catalytic apparatus 20 on the mounting surface 10 of the cylinder block 2.

An outboard motor 22 which includes the catalytic apparatus 20 and which embodies the invention is illustrated in FIGS. 3-10. The outboard motor 22 comprises (see FIG. 3) a transom bracket 24 fixedly mounted on the transom of a boat 28, and a swivel bracket 26 mounted on the transom bracket 24 for pivotal movement relative thereto about a generally horizontal tilt axis 30. The outboard motor 22 further comprises a propulsion unit 32 mounted on the swivel bracket 26 for pivotal movement relative thereto about a generally vertical steering axis 34. The propulsion unit 32 includes a drive shaft housing 36 including (see FIG. 9) a conventional exhaust passageway 40. The propulsion unit 32 also includes a propeller shaft 44 rotatably supported by the drive shaft housing 36, and a propeller 46 fixed to the propeller shaft 44 for rotation therewith.

The propulsion unit 32 also includes an engine 48 which, except for the substitution of the catalytic apparatus 20 for the cover plate, is substantially identical to the prior art engine 1 shown in FIGS. 1 and 2. Common elements have been given the same reference numerals. The engine 48 is drivingly connected to the propeller shaft 44 by a conventional drive train 50. The exhaust outlet 7 of the cylinder block 2 communicates with the drive shaft housing exhaust passageway 40 as shown in FIG. 9 and as known in the art.

The catalytic apparatus 20 includes (see FIGS. 5-8) a catalyst exhaust base 52 having an inner mounting surface 56 mating with the cylinder block mounting surface 10. An appropriate gasket (not shown) can be placed between the mounting surfaces 10 and 56 if necessary. The catalyst exhaust base 52 also includes a tongue 60 extending inwardly from the mounting surface 56 and (as shown in FIGS. 7 and 9) into the cylinder block exhaust passage 8. The tongue 60 divides the cylinder block exhaust passage 8 into upstream and downstream portions 64 and 68, respectively. The exhaust base 52 also has an outer mounting surface 72 that is parallel and oppositely disposed relative to the inner mounting surface 56. The mounting surface 72 defines (see FIG. 5) an exhaust inlet 76 and an exhaust outlet 80. The base 52 defines an upstream exhaust passage portion 84 communicating between the upstream cylinder block exhaust portion 64 and the exhaust outlet 80. The base 52 also defines a downstream exhaust passage portion 88 communicating between the exhaust inlet 76 and the downstream cylinder block exhaust portion 68. The exhaust passage portion 88 forms the inlet of the apparatus 20, which inlet communicates with the cylinder exhaust ports 5 and 6. The exhaust passage portion 84 forms the outlet of the apparatus 20.

In an alternative embodiment of the invention (not shown) the cylinder block 2 and catalyst exhaust base 52 can be cast as a single, integral piece, and considered to be a single cylinder block means defining the exhaust inlet 76 and exhaust outlet 80.

The exhaust base 52 also partially defines a water jacket 92. The base 52 includes a water jacket passageway 96 which communicates with the cylinder block water jacket 9 and which extends between the mounting surfaces 56 and 72. The upper end of the base 52 has thereon (see FIG. 6) a nipple 100. A tube 104 extends from the nipple 100 and forms (see FIG. 3) a telltale discharge. The base 52 also includes (see FIGS. 6 and 7) a generally vertical water jacket passageway 108 having an upper end communicating with the nipple 100, and the base 52 includes a generally horizontal water jacket passageway 112 extending through the tongue 60 and communicating between the passageway 96 and the passageway 108. The base 52 further includes (see FIGS. 5 and 6) a generally horizontal water jacket passageway 116 extending from the lower end of the vertical passageway 108 to the outer mounting surface 72.

The exhaust catalyst apparatus 20 further includes a plate-like catalyst housing 120 having (see FIGS. 7 and 8) an inner mounting surface 124 mating with the exhaust base outer mounting surface 72. An appropriate gasket (not shown) can be placed between the mounting surfaces if necessary. The catalyst housing 120 also includes (see FIGS. 5-8) an outer mounting surface 128 that is parallel and oppositely disposed relative to the inner mounting surface 124. The housing 120 also includes (see FIG. 5) a tubular portion 132 extending from the inner mounting surface 124 and into the exhaust base upstream exhaust passage portion 84. The tubular portion 132 defines an upstream exhaust passage portion 136 communicating with the exhaust base outlet 80.

The catalyst housing 120, as best shown in FIGS. 5 and 8, also has therethrough a downstream exhaust passage portion 140 extending between the mounting surfaces 124 and 128 and communicating with the catalyst exhaust base inlet 76.

Like the exhaust base 52, the catalyst housing 120 also partially defines the water jacket 92. The housing 120 includes (see FIG. 5) a pair of water jacket passageways 144 and 148 extending between the mounting surfaces 124 and 128 and communicating with the base water jacket passageway 96. The housing 120 also includes a downstream water jacket passageway 152 extending between the mounting surfaces 124 and 128 and communicating with the base water jacket passageway 116.

The apparatus 20 further includes (see FIGS. 5 and 6) a cylindrical catalyst 156 supported by the catalyst housing 120 within the tubular portion 132, i.e., within the upstream exhaust passage portion 136.

As best shown in FIGS. 5, 7 and 8, the catalytic apparatus 20 also includes an exhaust baffle 160. The exhaust baffle 160 has an inner mounting surface 164 mating with the catalyst housing outer mounting surface 128. An appropriate gasket (not shown) can be placed between the mounting surfaces 128 and 164 if necessary. The baffle 160 also includes an outer mounting surface 168 that is parallel and oppositely disposed relative to the inner mounting surface 164.

The baffle 160 includes (see FIGS. 7 and 8) an outer surface 170 that partially defines the water jacket 92. The baffle 160 includes (see FIG. 5) water jacket passageways 172 and 176 extending between the mounting surfaces 164 and 168 and communicating with the water jacket passageways 144 and 148 of the catalyst housing 120. The baffle 160 also includes a water jacket passageway 180 extending between the mounting surfaces 164 and 168 and communicating with the downstream water jacket passageway 152 of the catalyst housing 120.

As shown in FIGS. 7 and 8, the baffle 160 also includes an inner surface 184 cooperating with the outer surface 128 of the catalyst housing 120 to define a baffle/cover exhaust passage portion 186 communicating between the upstream and downstream exhaust passage portions 136 and 140 of the housing 120. The upstream base exhaust passage portion 84, the upstream housing exhaust passage portion 136, the baffle/cover exhaust passage portion 186, the downstream housing exhaust passage portion 140, and the downstream base exhaust passage portion 88 cooperate, in series, to form an exhaust passage 190 communicating between the upstream and downstream portions 64 and 68 of the cylinder block exhaust passage 8. Essentially, the inner surface 184 of the baffle 160 forms the outermost limit of the exhaust passage 190.

Finally, the catalytic apparatus 20 includes a catalyst cover 194. The cover 194 includes (see FIGS. 8 and 10) an inner mounting surface 204 mating with the baffle outer mounting surface 168. An appropriate gasket (not shown) can be placed between the mounting surfaces 168 and 204 if necessary. The cover 194 also includes (see FIGS. 7, 8 and 10) an inner surface 208 that cooperates with the baffle outer surface 170 to form a portion of the water jacket 92. Essentially, in conjunction with the outer surface 170 of the exhaust baffle 160, the cover 194 forms a portion of the water jacket 92 connecting the openings 172 and 176 of the baffle 160 with the opening 180 of the baffle 160.

The base 52, the housing 120, the baffle 160 and the cover 194 are all connected to the cylinder block 2 by a plurality of bolts or screws 220 extending through the cover 194, the baffle 160, the housing 120 and the base 52 and into the cylinder block 2. The base 52, the housing 120, the baffle 160 and the cover 194 can be considered a single housing which is mounted on the cylinder block 2 and which includes the exhaust passage 190. The cover 194, the baffle 160 and the housing 120 are preferably further secured to the base 52 by bolts or screws 224 extending through the cover 194, the baffle 160 and the housing 120 and into the base 52.

As shown by the arrows in FIG. 8, substantially all of the engine exhaust gases from the cylinder exhaust ports 5 and 6 are diverted by the tongue 60 into the catalytic apparatus 20 and through the catalyst 156. The exhaust gases pass from the upstream portion 64 of the cylinder block exhaust passage 8 into the exhaust base and catalyst housing upstream exhaust passage portions 84 and 136 and through the catalyst 156. Directed by the exhaust baffle 160, the exhaust gases then pass through the downstream exhaust passage portions 140 and 88 of the catalyst housing 120 and the catalyst exhaust base 52 and into the downstream portion 68 of the cylinder block exhaust passage 8. Finally, the exhaust gases are vented to the atmosphere via the cylinder block exhaust outlet 7 and the drive shaft housing exhaust passageway 40.

Water from the cylinder block water jacket 9 enters the catalytic apparatus water jacket 92 through the passageway 96 in the catalyst exhaust base 52. Some of this cooling water is diverted through the horizontal passageway 112 to the vertical passageway 108. Water in the vertical passageway 108 flows through the nipple 100 and the tube 104 to the atmosphere. The remainder of the cooling water in the catalyst exhaust base passageway 96 flows through the catalyst housing and exhaust baffle upstream water jacket passageways 144, 148, 172 and 176 and into the water jacket portion defined between the exhaust baffle 160 and the exhaust catalyst cover 194. From here, the cooling water flows through the baffle, catalyst housing and exhaust base downstream water jacket passageways 180, 152 and 116 to the vertical passageway 108 in the base 52. This water joins the water from the horizontal passageway 112 and flows through the nipple 100 and the tube 104 to the atmosphere.

Various features of the invention are set forth in the following claims.

We claim:

1. A marine propulsion device comprising a drive shaft housing, a propeller shaft rotatably supported by said drive shaft housing, an internal combustion engine drivingly connected to said propeller shaft, said engine including a cylinder block defining a cylinder having an exhaust port, an exhaust outlet, and an exhaust passage between said exhaust port and said exhaust outlet, an exhaust catalyst apparatus mounted on said cylinder block, said apparatus including a tongue extending into said cylinder block exhaust passage and dividing said cylinder block exhaust passage into an upstream portion communicating with said exhaust port and a downstream portion communicating with said exhaust outlet, and said apparatus including an exhaust passage communicating between said upstream portion and said downstream portion, and a catalyst located in said apparatus exhaust passage.

2. The marine propulsion device set forth in claim 1 wherein said cylinder block further defines a water jacket, and wherein said exhaust catalyst apparatus includes a water jacket communicating with said cylinder block water jacket.

3. The marine propulsion device set forth in claim 2 and further comprising a telltale discharge, and wherein said tongue has therethrough a passageway communicating between said apparatus water jacket and said telltale discharge.

4. The marine propulsion device set forth in claim 1 wherein said engine is mounted on said drive shaft housing.

5. An internal combustion engine comprising a cylinder block defining a cylinder having an exhaust port, an exhaust outlet, and an exhaust passage between said exhaust port and said exhaust outlet, an exhaust catalyst apparatus mounted on said cylinder block, said apparatus including a tongue extending into said cylinder block exhaust passage and dividing said cylinder block exhaust passage into an upstream portion communicating with said exhaust port and a downstream portion communicating with said exhaust outlet, and said apparatus including an exhaust passage communicating between said upstream portion and said downstream portion, and a catalyst located in said apparatus exhaust passage.

6. The engine set forth in claim 5 wherein said cylinder block further defines a water jacket, and wherein said exhaust catalyst apparatus includes a water jacket communicating with said cylinder block water jacket.

7. The engine set forth in claim 6 wherein said exhaust catalyst apparatus comprises a catalyst exhaust base mounted on said cylinder block and an exhaust catalyst cover mounted on said base.

8. The engine set forth in claim 7 wherein said exhaust catalyst apparatus further comprises an exhaust baffle between said base and said cover, and wherein said water jacket is defined by said exhaust baffle and said exhaust catalyst cover.

9. The engine set forth in claim 7 wherein said tongue extends from said exhaust base.

10. The engine set forth in claim 6 and further comprising a telltale discharge, and wherein said tongue has therethrough a passageway communicating between said apparatus water jacket and said telltale discharge.

11. The engine set forth in claim 5 wherein said catalyst apparatus includes a catalyst housing supporting said catalyst.

12. The engine set forth in claim 5 wherein substantially all exhaust gases flowing through said apparatus exhaust passage flow through said catalyst.

13. A method for adding a catalytic apparatus to an internal combustion engine including a cylinder block defining a cylinder having an exhaust port, and defining an exhaust outlet, an exhaust passage between the exhaust port and the exhaust outlet, and a mounting surface having mounted thereon an exhaust cover further defining the exhaust passage, said method comprising the steps of providing a catalytic apparatus including a housing assembly including a tongue and an exhaust passage, removing the exhaust cover, and mounting the housing assembly on the cylinder block mounting surface with the tongue extending into the cylinder block exhaust passage and dividing the cylinder block exhaust passage into an upstream portion communicating with the cylinder exhaust port and with the exhaust passage of the housing assembly, and a downstream portion communicating with the exhaust passage of the housing assembly and the cylinder block exhaust outlet.

14. The method of claim 13 wherein said cylinder block further defines a water jacket, and wherein said step of providing said housing assembly includes providing a water jacket communicable with said cylinder block water jacket.

15. The method of claim 14 wherein said step of providing said housing assembly includes providing a catalyst exhaust base adapted for mounting on said cylinder block and an exhaust catalyst cover mounted on said base.

16. The method of claim 15 wherein said step of providing said housing assembly includes providing an exhaust baffle between said base and said cover, and wherein said water jacket is defined by said exhaust baffle and said exhaust catalyst cover.

17. The method of claim 15 wherein said step of providing said tongue includes extending said tongue from said exhaust base.

18. The method of claim 13 wherein substantially all exhaust gases flowing through said housing exhaust passage flow through said catalyst.

19. An outboard motor comprising a drive shaft housing, a propeller shaft rotatably supported by said drive shaft housing, an internal combustion engine drivingly connected to said propeller shaft, said engine including a cylinder block which is mounted on said drive shaft housing and which defines a cylinder having an exhaust port, and an exhaust catalyst apparatus mounted on said cylinder block externally of said drive shaft housing, said apparatus defining an exhaust inlet communicating with said cylinder block exhaust port, an exhaust outlet, an exhaust passage communicating between said apparatus inlet and said apparatus outlet, and a catalyst located in said apparatus exhaust passage such that substantially all exhaust gases flowing from said exhaust port to the atmosphere flow through said catalyst at all times during engine operation.

20. An outboard motor as set forth in claim 19 wherein said drive shaft housing has therein an exhaust passage, and wherein said catalyst apparatus exhaust outlet communicates with said drive shaft housing exhaust passage.

21. An outboard motor as set forth in claim 19 wherein said cylinder block further defines a water jacket, and wherein said exhaust catalyst apparatus includes a water jacket communicating with said cylinder block water jacket.

22. An outboard motor as set forth in claim 21 wherein said outboard motor also comprises a telltale discharge, and wherein said catalyst apparatus has therethrough a passageway communicating between said apparatus water jacket and said telltale discharge.

23. An internal combustion engine comprising cylinder block means defining an exhaust inlet and an exhaust outlet, a catalyst housing connected to said cylinder block means, a catalyst supported by said catalyst housing, an exhaust baffle which is connected to said catalyst housing such that said catalyst housing is located between said exhaust baffle and said cylinder block means, and which cooperates with said catalyst housing to define an exhaust passage that communicates between said exhaust outlet and said exhaust inlet and that has therein said catalyst, and a cover which is connected to said exhaust baffle such that said exhaust baffle is located between said cover and said catalyst housing and which cooperates with said exhaust baffle to define a water jacket adjacent said exhaust passage.

24. An engine as set forth in claim 23 wherein said cylinder block means further defines a water jacket, and wherein said water jacket defined by said cover and said exhaust baffle communicates with said water jacket defined by said cylinder block means.

25. An engine as set forth in claim 23 wherein said cylinder block means includes an cylinder block defining said cylinder, and a catalyst exhaust base which is mounted on said cylinder block and which defines said exhaust inlet and said exhaust outlet of said cylinder block means.

26. An engine as set forth in claim 25 wherein said cylinder block defines a main exhaust outlet, and an exhaust passage between said exhaust port and said main exhaust outlet, and wherein said catalyst exhaust base includes a tongue extending into said cylinder block exhaust passage and dividing said cylinder block exhaust passage into an upstream portion communicating between said exhaust port and said cylinder block means exhaust outlet, and a downstream portion communicating between said cylinder block means exhaust inlet and said main exhaust outlet.

* * * * *